United States Patent
Rondolino et al.

(10) Patent No.: US 12,121,037 B2
(45) Date of Patent: Oct. 22, 2024

(54) METHOD AND PLANT FOR OBTAINING A READY-TO-USE FOOD PRODUCT BASED ON RICE GERM

(71) Applicant: RONDOLINO SOCIETA' COOPERATIVA AGRICOLA, Livorno Ferraris (IT)

(72) Inventors: Umberto Rondolino, Livorno Ferraris (IT); Piero Rondolino, Livorno Ferraris (IT)

(73) Assignee: RONDOLINO SOCIETA' COOPERATIVA AGRICOLA, Livorno Ferraris (IT)

( * ) Notice: Subject to any disclaimer, the term of this patent is extended or adjusted under 35 U.S.C. 154(b) by 364 days.

(21) Appl. No.: 17/607,103

(22) PCT Filed: May 13, 2020

(86) PCT No.: PCT/IB2020/054512
§ 371 (c)(1),
(2) Date: Oct. 28, 2021

(87) PCT Pub. No.: WO2020/230041
PCT Pub. Date: Nov. 19, 2020

(65) Prior Publication Data
US 2022/0225625 A1    Jul. 21, 2022

(30) Foreign Application Priority Data

May 14, 2019  (IT) .................. 102019000006825

(51) Int. Cl.
*A23B 9/08*  (2006.01)
*A23B 9/04*  (2006.01)
*A23L 7/152* (2016.01)

(52) U.S. Cl.
CPC .............. *A23B 9/08* (2013.01); *A23B 9/04* (2013.01); *A23L 7/152* (2016.08)

(58) Field of Classification Search
CPC .... A23B 9/02; A23B 9/04; A23B 9/08; A23B 9/10; A23L 7/152; H05B 6/64; H05B 6/78; H05B 6/782
(Continued)

(56) References Cited

U.S. PATENT DOCUMENTS 4,357,864 A * 11/1982 Salete-Garces ........... B02B 3/00
                                                    99/518
4,477,386 A * 10/1984 Fujita ........................ C11B 1/06
                                                    554/9
(Continued)

FOREIGN PATENT DOCUMENTS

CN       201004991 Y  *  1/2008
CN       101658205 A  *  3/2010
(Continued)

OTHER PUBLICATIONS

Bo Ling et al.; "Radio-frequency treatment for stabilization of wheat germ: Storage stability and physicochemical properties"; Innovative Food Science & Emerging Technologies; vol. 52, pp. 158-165; Mar. 2019; https://www.sciencedirect.com/science/article/pii/S1466856418310117 (Year: 2019).*
(Continued)

*Primary Examiner* — Drew E Becker
*Assistant Examiner* — Austin Parker Taylor
(74) *Attorney, Agent, or Firm* — Howson & Howson LLP (57) ABSTRACT

Method for obtaining a ready-to-use food product based on rice bud comprising: providing a certain quantity of rice bud; subjecting said quantity of rice bud to a radio-frequency drying treatment; packaging at least part of said quantity of dried rice bud.

15 Claims, 3 Drawing Sheets

(58) Field of Classification Search
USPC ................ 426/458, 459, 462, 463, 464, 465
See application file for complete search history.

(56) References Cited

U.S. PATENT DOCUMENTS

| | | | |
|---|---|---|---|
| 4,974,503 A | 12/1990 | Koch | |
| 5,699,724 A * | 12/1997 | Wettstein | .............. B07C 5/3425 |
| | | | 99/600 |
| 6,638,475 B1 | 10/2003 | Lagunas-Solar et al. | |
| 8,597,711 B2 | 12/2013 | Rondolino | |
| 2002/0122862 A1* | 9/2002 | Zohoungbogbo | ....... A23L 33/17 |
| | | | 426/549 |
| 2007/0196559 A1* | 8/2007 | Fukumori | ............. A23L 33/175 |
| | | | 426/618 |
| 2007/0243233 A1* | 10/2007 | Cherukuri | ............ A61K 31/401 |
| | | | 424/439 |
| 2016/0235109 A1 | 8/2016 | Cavestro | |

FOREIGN PATENT DOCUMENTS

| | | | | |
|---|---|---|---|---|
| CN | 104920718 A | * | 9/2015 | |
| CN | 107242437 A | | 10/2017 | |
| CN | 206851958 U | | 1/2018 | |
| CN | 206994268 U | * | 2/2018 | |
| CN | 108405065 A | * | 8/2018 | ............... B02C 9/04 |
| CN | 108477590 A | | 9/2018 | |
| CN | 109601860 A | | 4/2019 | |
| GB | 1078985 | | 8/1967 | |
| GB | 1078985 A | * | 8/1967 | |
| JP | S59-183667 A | | 10/1984 | |
| JP | 2002017279 A | * | 1/2002 | |
| KR | 20140134005 A | | 11/2014 | |
| KR | 101644127 B1 | | 7/2016 | |
| TW | 201826943 A | | 8/2018 | |

OTHER PUBLICATIONS

International Search Report and Written Opinion of the International Searching Authority issued for International PCT Application No. PCT/IB2020/054512 on Aug. 7, 2020.

Ling Bo et al., "Radio-Frequency Treatment for Stabilization of Wheat Germ: Storage stability and physicochemical properties", Innovative Food Science and Emerging Technologies, vol. 52, pp. 158-165, Mar. 2019 (Abstract only).

* cited by examiner

METHOD AND PLANT FOR OBTAINING A READY-TO-USE FOOD PRODUCT BASED ON RICE GERM

FIELD OF THE ART

The invention relates to a method and plant for the production of a ready-to-use food product based on rice bud. In particular, the invention relates to the processing of the fruits of the annual herbaceous plant of the Graminaceae family (*Oryza sativa*) known as rice, which is generally grown in humid environments and has flat linear leaves and flowers in corn, the fruit of which are white kernels arranged in ears, very rich in starch and of wide dietary use. Still more particularly, the invention relates to a method and a plant for obtaining rice bud from husked rice or paddy rice and for stabilizing the rice bud for marketing as a ready-to-use food for human or animal consumption.

BACKGROUND ART

Rice is a commodity widely used worldwide and is of high dietary importance in many cultures and areas of the world. The husked rice resulting from threshing the rice plant is known as paddy rice. Paddy rice is composed of several parts including glume, which covers the grain and accounts for about 20% by weight of the husked rice and grain. The rice grain is in turn composed of two parts, a darker outer part consisting of the cover and hull and an inner part consisting of starch and the bud. The bud is outside the grain and is housed in a small bag, the speroderm which, following separation, will form the so-called tooth of the grain of rice.

Of the rice the bud, also known as the germ or embryo, even though it only constitutes about 2% by weight of the total grain of rice, contains most of the nutrients (more than 60%) of this grain and is an excellent source of protein, amino acids, lipids and numerous minerals such as phosphorus, potassium, calcium, magnesium, as well as numerous vitamins. Rice bud is therefore particularly suitable as a dietary supplement, for example for obese individuals, and is useful for regulating blood pressure and treating diabetes.

Husked rice intended for human consumption must undergo a number of processes, such as the bleaching process, which deprives the grain of the bud and thus substantially reduces the product to a starch cluster (about 90% by weight of starch).

Following the results of recent studies on the nutritional potential of rice bud, its importance has begun to be assessed in the food sector, seeking to reintegrate rice bud within the grain, as described in WO2009063511, or to use it as an independent food.

One of the problems encountered in the production of rice bud foods is how to obtain a pure product, i.e. free of waste resulting from the processing of rice grains, such as grain fragments and rice bran, and of homogeneous size, i.e. buds of equal or almost equal size. A further problem encountered in the marketing of rice buds is how to prevent their deterioration and how to preserve their nutritional properties as long as possible over time.

According to a known technique, in order to obtain the rice bud, processing methods are generally used that provide for the elimination of the rice bran from the grain and the removal of impurities by airflows. The product thus obtained is dried by hot air and then subjected to a roasting process to reduce its moisture and prolong its shelf life.

KR101644127 (B1) teaches how to separate the bud from the grain of rice by a selection step, depending on weight and colour. The process described herein uses vibrating screens, airflows and LED and CCD technology to perform the selection. A final steam treatment step is also provided to sterilize the obtained product.

KR20140134005 (A) teaches a method of inhibiting the action of lipolytic enzymes in rice bran, known to cause deterioration of the product, by separating and separately stabilizing the bud, or embryo and rice bran. The rice bran undergoes a roasting treatment, i.e. drying by heating at high temperature, 110-130° C., for 5-20 minutes and is then cooled. In one step of the method the rice bud, previously separated from the grain, is roasted at 140-160° C. for 5-20 minutes and then cooled.

Another example of rice bud processing is described in JPS59183667 which refers to a faster treatment than the traditional ones and which operates with superheated steam in the initial step, and dryers in a later step. In any case, the heating is guaranteed until a minimum desired amount of moisture is reached.

These methods are time-consuming and do not guarantee high product quality after heating. In fact, toasting tends to modify the nutritional characteristics due to the destruction of vitamins caused by the high temperatures to which the treated product is subjected. In addition, this type of treatment tends to give the product a typical flavour and aroma, which do not reconcile with the need to maintain the original characteristics of the fresh product.

The market demand for natural but microbiologically safe products and the needs of modern food distribution logistics have led the industry to seek and develop new processes for the inactivation of microorganisms and enzymes, able to meet these two seemingly conflicting needs: safe foods on the one hand, but with a long shelf life and a fresh taste on the other.

In the treatment of foodstuffs, in order to prolong their shelf life and in order to exceed the limits of known processes, endogenous heating has been experimented with by means of very intense oscillating electromagnetic fields.

Endogenous heating allows for the uniform and rapid heating of matter. Endogenous heating can be achieved by radio-frequency treatment. This type of treatment is part of a technology which is often called dielectric heating. This is a process by which heat can be transferred to a body using the propagation of electromagnetic waves.

As is well known, when a dielectric material is subjected to the action of an external electromagnetic field, the molecules of which it is composed undergo a phenomenon called polarization: electrical dipoles, whether induced by the field itself or permanent, are arranged according to the direction of the applied electric field. The use of an oscillating field induces a vibro-rotational effect of molecules (particularly dipolar molecules such as water) or spatial charges: if the polarity of the outer field is periodically inverted, the dipoles are forced to undertake an oscillatory movement (with equal frequency) to realign with the field itself.

The time to reach balance orientation is called relaxation time, and its reciprocal is called relaxation frequency. At high frequencies, typically in the field of radio frequencies where the polarity of the field is reversed several million times per second, the rapid oscillation and the consequent intermolecular friction ensure that there is a dissipation of energy in the form of heat, that is, that part of the energy conferred by the external magnetic field is absorbed by the molecules that begin to vibrate and transform it into thermal energy. If then ionic species are also present in the material, having a certain freedom of movement, the previous effect is also added to that due to the rapid motion of these species, also induced by a similar mechanism.

These phenomena, which generate a great dissipation of kinetic and magnetic energy in the form of heat, give rise to a homogeneous heating action, independent of size, weight, density and thermal conductivity.

One way in which the electromagnetic field can polarize a dielectric material and transfer energy to it is called dipolar polarization, which occurs in materials made up of dipolar molecules (such as HCl or $H_2O$) and weakly even in larger molecules, which have polar groups capable of rotating. Its dipoles can change their spatial orientation and tend to align with an applied electric field, with a very marked dependence on temperature. In fact, at very low temperatures dipoles tend to "freeze" in reticular positions, while increasing the temperature releases these dipoles and makes them available for orientation. At high temperatures, thermal agitation tends to cancel out this phenomenon. This polarization occurs at frequencies between 1 kHz and 100 MHz. Due to the action of the electric field, the orientation of dipoles may not be complete: for this reason it is possible to heat many polar dielectric substances at high frequency. High-frequency polarization losses can also be considerable and even lead to intense heating.

Radio-frequency (RF) technology has recently been introduced into some industrial drying processes.

Radio frequency, in general, occupies a portion of the electromagnetic spectrum between 1 and 300 MHz, although for industrial heating processes the frequencies mainly used are between 10 and 50 MHz and, within the latter range, only the selected frequencies 13.56, 27.12 and 40.68 MHz are generally allowed for industrial, chemical and medical applications.

The principle of radio-frequency heating essentially exploits an electromagnetic field established between two plates, within which the material to be heated is placed. This heating technology is used during sterilization, thawing and drying processes.

U.S. Pat. No. 4,974,503 describes a food processing apparatus comprising electrodes and counter-electrodes capable of defining an electromagnetic radiation zone of the products in transit, with an electromagnetic field frequency between 13 and 440 MHz.

U.S. Pat. No. 6,638,475 teaches to inhibit the action of pathogens, the cause of food deterioration, by treatment with radio-frequency electromagnetic field. The applied radiation is between 0.1 MHz and 1000 MHz and has a low intensity so as to generate an environment hostile to pathogens, resulting from the localized heating of the product to be treated.

WO2015044723 (A1) describes an apparatus and method for drying bulk products such as foodstuffs, for example grains, flour and seeds. This apparatus comprises a conveyor for the bulk products to be treated, a treatment unit delimiting a treatment chamber, radio-frequency electromagnetic radiation generators and radiation applicators, which act in the chamber in which the bulk products to be treated transit.

LING BO ET AL: "Radio-frequency treatment for stabilization of wheat germ: Storage stability and physicochemical properties", INNOVATIVE FOOD SCIENCE AND EMERGING TECHNOLOGIES, vol.52, pages 158-165, XP085635878, ISSN: 1466/-8564/DOI 10.1016/J.IFSET.2018.12.002 describes a method for stabilizing wheat bud with the use of radio-frequency, subsequent cooling to room temperature and packaging in polyethylene bags.

TW describes a method and plant for drying paddy rice in which radio frequency and hot air are applied.

In the prior art relating to the rice sector in particular, this type of treatment is reserved primarily for a component of rice, bran, as described in CN109601860, CN107242437 and CN206851958. In addition, CN 108477590 extends the application of radio-frequency heat treatment to Yangzhou fried rice by defining a certain range of useful frequencies ranging from 10 to 300 MHz.

As can be seen from the prior art, the main problems in the field of wide-range foods are related to the longevity of the product stored under optimal conditions.

A first object of the present invention is to overcome the problems observed in the treatment methods of the known art, used to prolong the shelf life of the foods. These problems mainly derive from the poor efficacy and from the alteration of nutritional properties and vitamin content, with particular reference to rice buds. The invention therefore aims to obtain the preservation of the rice bud not only in order to prevent or counteract the natural process of decomposition but mainly for the purpose of eliminating or inhibiting the action of the microorganisms and enzymes present, responsible for the decomposition itself or capable of producing unwanted modifications, with a treatment that maintains the vitamin properties of the product as much as possible.

Another object of the invention is to provide a method and plant for the production of rice bud from paddy rice and thus to obtain a ready-to-use food product based on rice bud which can be stored for a long time without substantial modification.

These and other objects are obtained by the method and the plant as claimed in the appended claims.

DESCRIPTION OF THE INVENTION

With the aim of respecting the original characteristics of the product, radio frequency has allowed optimal results to be achieved, reducing bacterial load within the required limits without altering the properties of the food product. Furthermore, the radio-frequency treatment allowed to overcome the aforementioned drawbacks of the prior art, while maintaining the safety and speed characteristics in the application of the process.

Advantageously, the ability of the radio frequency to heat volumetrically does not depend on the thermal conductivity of the substrate for the heat exchange throughout its mass. Since the required process temperatures are reached quickly and precisely, the degradation of the product is minimized and above all the alteration of the vitamin content is substantially avoided. Radio-frequency equipment requires less space than other machines based on conventional heating technology, which have long heating times and require large volumes of product being processed at all times.

Since thermal energy is not dispersed in the environment, the radio-frequency process is more efficient, economical and environmentally friendly and makes it possible to significantly reduce the environmental impact of an industrial production plant.

In a first step of development of the invention, the combined effect of dehydration of the germ at 40° C. in a vacuum oven and its storage in three different atmospheres—air, vacuum in bags (PA/PE—polyamide/polyethylene) and nitrogen—was considered as a strategy for improving the "shelf life" of the rice bud. The dried samples had, respectively, the following moisture levels and water activity: 8.44 g/100 g ($a_w$=0.47), 7.58 g/100 g ($a_w$=0.39) and 6.02 g/100 g ($a_w$=0.29), while the non-dried germ had a moisture content of 11.79 g/100 g and a water activity $a_w$ of 0.65.

Some conclusions were drawn from the tests carried out. Firstly, the critical point for improving the preservation of the product was the activity value of the water and therefore the moisture content of the sample. In fact, after 50 days of storage in both air and under nitrogen, the non-dried germ had a more discriminating olfactory impression (evaluation carried out by means of electronic nose) than that of the fresh sample. In addition, storage under nitrogen did not appear suitable for the formation of foreign and unpleasant odours, not related to a rancid odour. Vacuum storage in a PA/PE bag also allowed the shelf life of the germ to be extended to up to 180 days of storage for all products subjected to drying. On the basis of the considerations made, it was concluded that the optimum moisture content for the dried product should be between 7 and 8%.

The tests used rice bud in which the germ had a significant amount of fragments of rice or other impurities; the purity, assessed by manual separation tests, was about 68%.

In order to reduce the variability of the data caused by the presence of material other than germ, and therefore in order to obtain a more reliable result, the product was cleaned manually using a series of sieves with different mesh sizes in order to retain coarse rice fragments and the remaining parts of husk. A batch of 66.7 kg of rice germ was thus obtained, with a final purity of 86%.

A second test step was then performed in which the germ obtained following the described purification was subjected to a drying pretreatment, as occurred in the first test step. The drying of the samples was performed by placing the germ in a vacuum oven at 40° C. for several hours, spread out on trays with a capacity of 3 kg with a product layer thickness on the trays of about 5-7 cm, with cycles of 2 kg of product for each treatment. Every two hours the vacuum was interrupted and 3 g of material was randomly sampled from each tray. The water activity was analysed at each sampling. The treatment in the oven continued until the desired water activity was reached and was considered optimal. In addition to the non-dried germ (sample A1) having a moisture level of 9.71±0.11 g/100 g, two additional batches of samples with a moisture level of 7.7-7.9 g/100 g (samples B) and 6.8-6.9 g/100 g (samples C) were prepared. The non-dried germ of this second test step therefore had a moisture content of about two percentage points lower than in the previous experiment (9.71 g/100 g versus 11.79 g/100 g).

As regards the packaging methods, vacuum packaging in a bag was therefore excluded, instead considering vacuum packaging in a can, in an atmosphere partially compensated with argon (samples B2 and C2). In addition, the third type of packaging did not involve the use of nitrogen, but of argon (B3 and C3). The alternatively stored products were compared with both the air-preserved germ, without any drying (A1) and air-preserved germ after drying at the two levels previously reported (B1 and C1).

All the packages provided were made by placing 130 g of bud in hermetically sealed 210 g cans. The samples were stored at 27° C. for 322 days, at a temperature of 27° C. to accelerate any degradation reactions of the oil contained in the germ and samples were taken during storage to perform the analyses as required by the experimental plan: humidity, water activity, pH, acidity, number of peroxides and olfactory fingerprint by electronic nose. All analyses were carried out in duplicate on each package. In particular, samples were taken at the times 0, 32, 62, 95, 131, 180 and 322 days.

The moisture (Hu), water activity ($a_w$), total lipids and number of peroxides (PV) of the germ used in this test step are reported in Table 1.

TABLE 1

Characterization of non-dried rice germ (sample A1)

| Hu (g/100 g) | $a_w$ | Total lipids (g/100 g) | PV (meq $O_2$/kg oil) |
|---|---|---|---|
| 9.71 ± 0.11 | 0.553 ± 0.003 | 17.67 ± 0.38 | 0.76 ± 0.073 |

After drying, at the beginning of the storage step, the samples had water activity values of 0.45 (B1, B2, B3) and 0.36 (C1, C2, C3) as shown in Table 2.

TABLE 2

Humidity and water activity of samples after drying

| Atmosphere | Hu (g/100 g) | $a_w$ | Code |
|---|---|---|---|
| Air | 7.77 ± 0.19 | 0.453 ± 0.002 | B1 |
| Air | 6.80 ± 0.06 | 0.360 ± 0.009 | C1 |
| Vacuum | 7.92 ± 0.12 | 0.452 ± 0.001 | B2 |
| Vacuum | 6.83 ± 0.26 | 0.363 ± 0.001 | C2 |
| Argon | 7.71 ± 0.08 | 0.452 ± 0.001 | B3 |
| Argon | 6.91 ± 0.24 | 0.359 ± 0.001 | C3 |

These two test steps allowed to determine, with the traditional technique according to the known art, the conditions of moisture and water activity to be reached for an optimal preservation of the product.

In order to improve shelf life and to maintain the vitamin content of the bud substantially unchanged, germ drying tests were performed using radio-frequency technology. The radio-frequency treatment proved beneficial not only for its efficacy and speed, but also for the possibility of inactivating the degradation process of the product caused by the action of enzymes on the components of the bud itself.

Some drying tests were carried out on a product with a purity of 75% and a chemical composition as shown in Table 3.

TABLE 3

Physical chemical characteristics of the germ

| Component | Value |
|---|---|
| Carbohydrates (g/100 g) | 49.7 |
| Protein (g/100 g) | 13.3 |
| Fat (g/100 g) | 20.8 |
| Ash (g/100 g) | 6.6 |
| Moisture (g/100 g) | 9.5 |
| Water activity | 0.580 |
| Density (kg/m$^3$) | 610.44 |
| Weight (mm %) | 0.500 < X < 1.0  81.27 |
| Specific heat (J/kgK) | 1716.8 |

The sample therefore had a moisture content and water activity value similar to the germ used in the previously described preservation tests in the method according to the prior art.

Radio-frequency drying tests were carried out using various combinations of duration, temperature and air recirculation, obtaining the samples shown in Table 4.

TABLE 4

Radio-frequency operating conditions

| Test | T (° C.) | t (min) | Air recirculation |
|---|---|---|---|
| 1 | 25 | 10 | YES |
| 2 | 25 | 15 | YES |
| 3 | 70 | 10 | YES |
| 4 | 85 | 5 | YES |
| 5 | 85 | 3 | NO |
| 6 | 90 | 11 | NO |
| 7 | 90 | 9 | YES discontinuous |

After radio-frequency drying, at the beginning of storage, the samples had the moisture and water activity values shown in Table 5.

TABLE 5

Moisture (Hu) and water activity ($a_w$) of the samples obtained in the radio-frequency drying tests.

| Test | Hu | $a_w$ |
|---|---|---|
| TQ - Untreated sample | 9.70 ± 0.11 | 0.580 ± 0.002 |
| 1 | 7.76 ± 0.04 | 0.456 ± 0.001 |
| 2 | 7.39 ± 0.05 | 0.422 ± 0.001 |
| 3 | 5.67 ± 0.05 | 0.336 ± 0.005 |
| 4 | 6.05 ± 0.13 | 0.369 ± 0.001 |
| 5 | 8.19 ± 0.02 | 0.541 ± 0.003 |
| 6 | 8.43 ± 0.01 | 0.551 ± 0.001 |
| 7 | 4.73 ± 0.12 | 0.286 ± 0.001 |

Looking at the data reported in Table 5, it is evident that the moisture and water activity values are strongly influenced by the temperature and drying times. For example, a treatment at 25° C. for 10 s with recirculation allows the reduction of the moisture content from 9.7 to 7.76 g/100 g, while a similar time at 70° C. causes the reduction of moisture to values of 5.67 g/100 g. Similar times at 90° C. bring the product to a moisture value of 4.73%. However, the treatments carried out at 85 and 90° C. without air circulation are not very effective.

In order to highlight any chromatic variations induced by the treatments, the chromatic coordinates L*, a*, b* of germ samples subjected to different conditions were evaluated (Table 6).

TABLE 6

Colour of the samples obtained in the radio-frequency drying tests.

| Test | L* | a* | b* | a*/b* |
|---|---|---|---|---|
| TQ | 72.62 ± 1.49 | 0.32 ± 0.08 | 21.26 ± 0.43 | 0.02 |
| 1 | 72.22 ± 0.91 | 0.52 ± 0.57 | 22.86 ± 1.29 | 0.02 |
| 2 | 72.88 ± 1.14 | 0.22 ± 0.16 | 21.80 ± 1.09 | 0.01 |
| 3 | 75.06 ± 1.02 | 0.44 ± 0.17 | 19.30 ± 0.73 | 0.02 |
| 4 | 68.63 ± 0.17 | 0.20 ± 0.22 | 18.63 ± 0.68 | 0.01 |
| 5 | 69.60 ± 0.96 | 0.82 ± 0.15 | 25.50 ± 1.21 | 0.03 |
| 6 | 70.34 ± 0.78 | 0.58 ± 0.16 | 25.00 ± 0.25 | 0.02 |
| 7 | 73.00 ± 1.10 | 0.52 ± 0.23 | 22.26 ± 1.65 | 0.02 |

As can be seen from Table 6, the treatment with radio frequencies had no particular effect on the treated samples, except for samples 5 and 6, where there is an increase in the chromatic coordinates a* and b* indicating that a temperature above 85° C. without air circulation, and therefore without evaporation, results in a darkening of the product. On the contrary, the evaporation of water even at high temperatures, such as 85° C., ensures better preservation of the original colour of the material by virtue of the absorption of latent heat from the product and therefore the consequent reduction of the temperature of the product itself. Finally, a microbiological evaluation was carried out to evaluate the possible sanitizing effect attributable to the thermal effects related to the application of radio frequencies. Total Bacterial Charge (CBT) and Mould Count (Table 7) were evaluated. Radio-frequency treatments conducted at 85 and 90° C. were effective in reducing CBT by two and three logarithmic cycles and eliminating almost all mould.

TABLE 7

CBT and moulds from radio-frequency treated samples

| Test | CBT CFU/g | Moulds CFU/g |
|---|---|---|
| TQ | 1.60E±05 | 3000 |
| 3 | 1.20E±05 | <100 |
| 4 | 1.00E±05 | <100 |
| 5 | 7.00E±05 | <100 |
| 6 | 600 | <100 |

The heat treatment, in addition to reducing the microbial load of the germ, resulted in partial inactivation of the lipases (expressed as mg oleic acid/100 g DM) which had values of 195.5 in the non-dried sample, 132 in the sample dried at 85° C. for 5 minutes and finally 82.7 in the product treated at 90° C. for 11 minutes.

The product was then subjected to the storage test for 213 days at 27° C. and examined after 90 days and at the end of storage. The evaluation of the moisture content and water activity was carried out in order to verify any changes in these parameters due to the incorrect closure of the packages or other anomalies occurring during prolonged storage.

The storage tests carried out established that the moisture remains almost constant, indicating an excellent seal of the packages even for prolonged periods of time.

The comparison between the two packaging atmospheres shows that air storage promotes a greater increase in the number of peroxides which, while remaining at modest values, doubles its value compared to vacuum storage.

The sample treated at 90° C. for 5 minutes (residual moisture of 4.73 g/100 g) has the worst performance probably due to excessive disorganisation of the cell structure during heat treatment attributable both to the temperature reached and, presumably, to an overly rapid evaporation of water resulting in contact between the fat fraction and the residual enzyme component. In addition, the water activity of the sample, equal to 0.286, represents a further factor that accelerates the oxidation of lipids. The two samples treated without recirculation and having the highest water activity values (0.54 and 0.55) with moisture at 8.19 and 8.43 have a greater acceleration of oxidation when stored in air.

During storage, the increase in acidity was modest and lower than that of the samples from the previous trial.

The tests carried out have shown that to improve the shelf life of the bud it is necessary to reduce the moisture of the product to values between 6 and 7 g/100 g corresponding to a water activity of between 0.35 and 0.40. In addition, the superiority of the radio-frequency technique, a very efficient technology able to heat the product directly and instantly, combined with ventilation to promote the dehydration of the material in a very short time, was evident. In particular, it was interesting to use temperatures of 80-85° C. with air recirculation and with residence times of a few minutes. These temperatures caused, in addition to the dehydration of the product, the reduction of microbial load both in terms of total bacterial count and mould and a partial inactivation of lipases. Temperatures of 90° C. for 9 minutes with air recirculation instead led to excessive dehydration, increased peroxide count and slight darkening of the germ. On the contrary, treatments at high temperatures but without air recirculation did not lead to dehydration of the bud (residual moisture values greater than 8%). After 90 days of storage, the latter products had an unpleasant odour, differentiating themselves from the other samples.

According to the invention, therefore, the bud is subjected to a drying step which causes the temperature of the rice bud to rise to a temperature preferably in the range of 75-90° C. and even more preferably in the range of 80 to 85° C.

Also according to the invention, the moisture percentage of the bud at the end of the drying step is preferably between 5 and 8%.

According to the invention, advantageously, the bud thus obtained and treated substantially retains the original vitamin content of the natural bud.

As for the atmosphere in the package, excellent results were obtained by packaging the bud in a vacuum can even after storage for about seven months.

The invention advantageously allows to obtain a bud-based product with very high purity, preferably at least 80% by weight and even more preferably over 90% by weight, and with an equally high capability of being stored for long time. Advantageously, the invention allows to achieve a high degree of bud purity, resulting in an equally high degree of concentration of nutritional substances, in particular vitamins and lipids in the obtained product. This results in an advantage in terms of the quality and commercial value of the product, but at the same time increases its susceptibility to rapid deterioration. Therefore, in the absence of an adequate solution to the problem of how to stabilize the organic substances contained in the pure bud, so that the product can be stored for a long time and marketed with an adequate shelf life, it would be difficult, if not impossible, to commercially exploit the high performance achieved in terms of purity, of the first part of the plant. Especially the lipids or fats contained in the bud and produced by the method according to the invention make the product very perishable and the radio-frequency treatment allows to remedy this problem, obtaining a long-lasting and very pure product. The combination of a first cycle of rice processing to obtain the extraction of a high purity bud with a second cycle of stabilization by radio frequency, determines the synergistic effect of allowing the preservation for long periods of time of a substance, the pure bud, with a high susceptibility to deterioration.

BRIEF DESCRIPTION OF THE FIGURES

Certain preferred embodiments of the invention provided by way of non-limiting example will be described with reference to the accompanying figures in which.

DESCRIPTION OF A PREFERRED EMBODIMENT

Figure 1A:
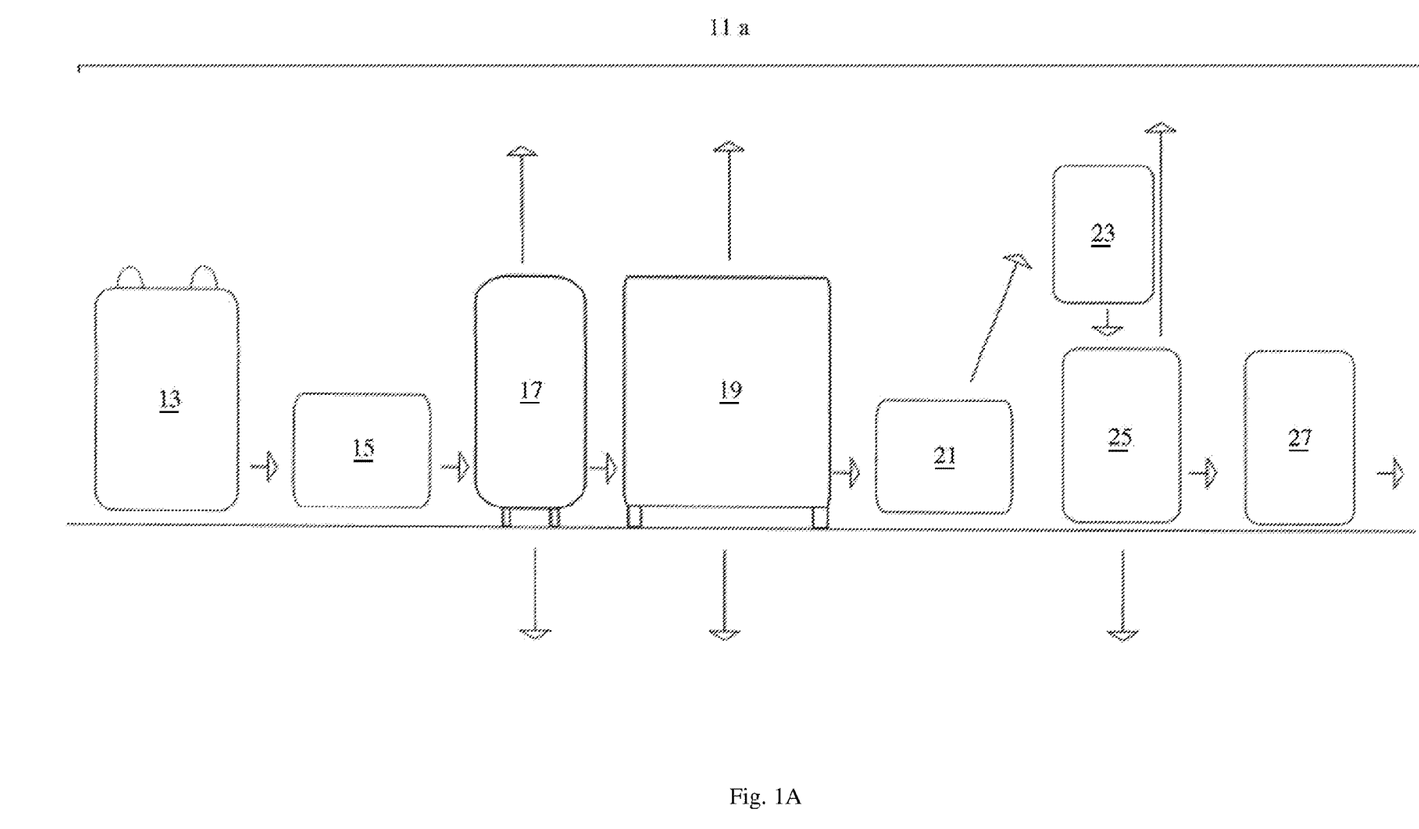
FIG. 1A is a block diagram of a first portion of a plant for obtaining rice bud.
Figure 1B:
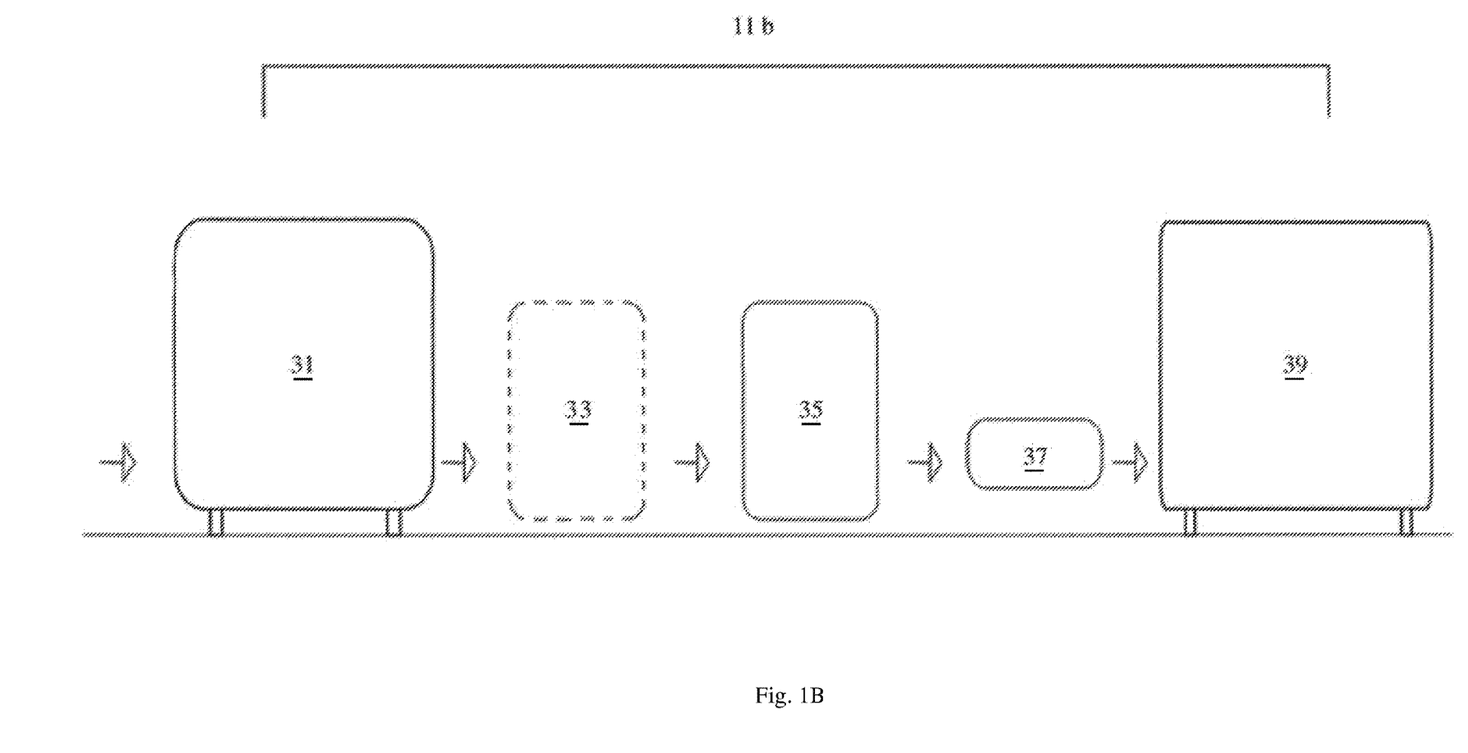
FIG. 1B is a block diagram of a second portion of a plant for the stabilization of the rice bud.

With reference to FIGS. 1A and 1B, a preferred embodiment of the facility for the production of a ready-to-use food product based on rice bud according to the invention is described. The described facility is capable of producing a ready-to-use food product, based on rice bud, from husked rice, or paddy rice, resulting from the threshing of the rice plant.

FIG. 1A shows a first portion 11a of a facility 11 intended for obtaining rice bud, in accordance with a preferred embodiment of the invention. In the portion 11a, the number 13 refers overall to a paddy rice delivery station. Starting from the delivery station 13, the paddy rice is transferred to a first cyclone 15 associated with a corresponding blower. The purpose of the cyclone is to separate the most volatile dusts from the heavier material to be treated. The cyclone 15 comprises a vertically extending cylindrical chamber that ends below with a conical portion. Within the chamber of the pneumatic cyclone, thanks to the combined effect of the blower blowing from below inside the cyclone and gravity, a downwards vortex motion of the material from the top of the cyclone is determined. The heavier material falls on the bottom, while the rising air stream frees the lighter dusts outwards.

The material exiting the bottom of the cyclone is transferred to a separation station 17 preferably comprising a machine consisting substantially of a sieve. Even more preferably, the station 17 comprises a plansifter-type sieve. As is known, a plansifter is an ancient machine comprising a cylinder arranged with the axis slightly inclined horizontally, whose lateral surface consists of a fabric or a metal sheet, i.e. a perforated sheet, according to the various purposes of use.

The thickness of the fabric or the diameter of the holes in the plansifter varies from end to end (the finest towards the highest end). Once the material is introduced from this higher end, the rotation of the plansifter advances it towards the lower end while larger and larger particles are separated therefrom which fall below the cylinder, into hoppers arranged to collect them.

In certain cases the separation in the plansifter can be facilitated by an air current that flows into the machine and which has the function, at the same time, of cleaning the material from dust. The plansifter used in this preferred embodiment of the invention preferably has a hexagonal cross section advantageously capable of generating a discontinuous oscillation of the product that optimizes its selection by size.

The purpose of the separation station 17 within the facility 11 is substantially to separate the rice grains that are destined for the subsequent processing phases from the waste, such as, in particular, bran, husk, and middling.

The material exiting the separation station 17 is transferred to a subsequent classification station 19 comprising substantially a machine capable of separating the materials according to their specific weight. In particular, the classification station 19 is capable of separating the so-called rice tips, i.e. broken rice grains smaller than half a grain in size, which are discarded, from the half-grain, i.e. rice with a size equal to or larger than half a grain size and intended for the subsequent processing steps.

Even more preferably the station 19 comprises a grinding machine. The grinding machine consists mainly of one or more oscillating sieves, onto which the material is carried. The light particles are held up by an air current caused by an underlying fan, while the heavier parts are sifted and collected in special hoppers.

The material evacuated from the station 19 is transferred to a second cyclone 21 substantially identical to the first cyclone 15 and also equipped with a corresponding blower. The purpose of this second cyclone 21 is always to separate the unwanted volatile dusty materials upwards, allowing the heavier material to fall downwards thanks to the cyclonic movement and the combination of the ascending air stream with the effect of gravity, and destined for subsequent processing steps. According to a preferred embodiment of the invention, the cyclone 21 is a machine substantially identical to the cyclone 15.

The material exiting the second cyclone 21 is transferred to a first vibrating tank 23 equipped with a vibrating floor from which the bud of the rice grain is precipitated onto a densimeter table 25 for the selection of the largest buds which are most suitable for marketing. The densimeter table 25 is a vibration machine used to obtain a classification of the bud according to specific weight. The densimeter table 25 is therefore susceptible to separate smaller and often still contaminated buds of rice grains, which are discarded, from the larger ones intended for marketing.

The material consisting mostly of the rice bud from the densimeter table 25 is then sent to a second vibrating tank 27, substantially identical to the first tank 23.

The rice bud obtained by the described method is then transferred to a second portion of the facility 11, where a stabilization cycle takes place to ensure the final product lasts as long as desired, avoiding the deterioration of nutritional properties.

It should be noted that, according to the invention, the second portion of the facility 11 is capable of treating rice buds, either from the described first facility portion 11a or from other sources, e.g. rice buds purchased from third-party producers. The facility 11 as a whole is therefore very flexible in that it is able to process, depending on the availability of raw material (paddy rice) and market requirements, material from local production and/or other sources, even remote, making it substantially possible to use any variety of rice and mixtures thereof.

Preferably, according to the invention, the rice bud obtained with the disclosed first facility portion advantageously exhibits a purity greater than 70%, and still more preferably greater than 85%. That is, the product obtained with the first facility portion 11a has a bud content of at least 70% by weight and more preferably more than 85% by weight, while the remaining portion of the product, at least 30% by weight and at least 15% by weight respectively, consists mainly of other parts of the paddy rice, other than pure bud. Advantageously, the first portion 11a of the facility according to the invention allows to achieve a high degree of bud purity, resulting in an equally high concentration of nutritional substances, in particular vitamins and lipids in the obtained product. This results in an advantage in terms of the quality and commercial value of the product, but at the same time increases its susceptibility to rapid deterioration. Therefore, in the absence of an adequate solution to the problem of how to stabilize the organic substances contained in the pure bud obtained in the first portion 11a of the facility, so that the product can be stored for a long time and marketed with an adequate shelf life, it would be difficult, if not impossible, to commercially exploit the high performance achieved in terms of purity, of the first part of the facility. Especially the lipids or fats contained in the bud and produced in the first portion of the facility make the product very perishable and the radio-frequency treatment allows to remedy this problem, obtaining a long-lasting and very pure product. Note in this regard that the purity of the bud obtained in the first facility portion 11a depends on the synergistic effect of the sequence of purification steps of the method according to the invention.

Next, with reference to FIG. 1B, the second portion 11b of the facility 11 will be described, that is, the portion responsible for stabilizing the bud.

In the second facility portion 11b the rice bud, whether from portion 11a or from other sources of supply, e.g., bulk bud bags, is introduced into a radio-frequency stabilization station 31. Preferably, according to the invention, a certain amount of bud is placed on a conveying assembly, for example a conveyor belt, in a bed of suitable thickness, typically between 10 and 20 cm and introduced into a treatment chamber of the stabilizing station 31. The conveyor belt advances at a predetermined and controlled speed so that the treatment with radio frequency takes place as planned and obtaining the desired stabilization result.

The station 31 mainly comprises a radio-frequency dryer. The dryer is mainly made of four sections: a generator, an applicator, a coaxial radio-frequency transmission line and an impedance adapter.

In the illustrated embodiment, the generator is powered by mains power, produces, and makes available an electromagnetic field that oscillates at a frequency of about 27 MHz. The radio-frequency generator can be implemented with one or more triodes and for each of them there is a filament heating system, a double half-wave rectifier, a controlled oscillator and a cooling system. The maximum power can be around 600 kW and the overall efficiency is around 60%.

The electromagnetic radiation applicator is intended to invest bulk products with electromagnetic radiation which are transported through the treatment chamber defined within the station 31. It is a device by which an alternating electromagnetic field is applied to the product to be heated. It consists of two opposing electrodes, which can be considered as the two plates of a capacitor. For the applicator there are three different preferred possible architectures, the use of which depends on the nature and thickness of the product to be treated and the shape of the magnetic field lines to be obtained. The electrodes are able to transfer high power values with fairly low voltages and therefore also greater safety margins. The electrodes can be made in the form of flat plates, interconnected parallel bar grids, or in other forms. For example, rectangular, cylindrical, or elongated electrodes are used. Finally, depending on the application, fixed-height electrode systems, i.e. with predetermined automatic positioning, or variable systems can be used for example to accommodate the variation in thickness of the bed of buds in transit on the conveyor belt.

The material to be heated is placed between the electrodes, i.e. transits between the electrodes on the conveyor belt, but is always separated from them by a dielectric, for example atmospheric air.

The coaxial line allows the transport of energy from the generator to the impedance/load adaptor group; "50Ω technology" is widespread, which allows the plants to work in optimal conditions, without reflection phenomena (and therefore stationary waves) within the line.

In a preferred embodiment of the invention, the rice bud exiting the stabilization station 31 is conferred to a vibrating tank 35 and from there to a weighing machine 37. The desired amount of rice bud is then delivered to a packaging station 39. In the packaging station 39 the rice bud is packaged in containers of various kinds, depending on the nature of the intended use. Preferably the rice bud is packaged in metal vacuum cans in a modified and pressurized atmosphere containing for example nitrogen or other suitable gases for the purpose. Or, the rice bud can be packaged in single-dose, quick-use sachets, preferably always in vacuum and in a modified atmosphere with the addition of nitrogen or other suitable gases. For other uses, the rice bud thus stabilized can be packaged in bags, boxes, envelopes of various sizes and material, with or without vacuum and with or without controlled atmosphere.

In an embodiment of the invention, the rice bud exiting the radio-frequency stabilization station 31 and subsequently undergoing the stabilization process is cooled by passing through a cooling station 33.

According to the invention, preferably the cooling step causes the temperature of said rice bud to be lowered to a temperature less than 20° C. Still more preferably, according to the invention, the temperature of the bud at the end of the cooling step is between 12 and 16° C.

Advantageously, according to the invention, the cooling is applied so as not to cause the product to perish and, to prevent it from becoming rancid, the cooled product is preferably packaged within 24 hours in a modified nitrogen atmosphere. The cooling takes place in the station 33 by means of a downstream air stream cooled by an air conditioner placed at the top of the station 33 and the air circulation is favoured by suction from below, under the conveyor belt. For this reason, the conveyor belt comprises a perforated and preferably micro-perforated belt to allow air to pass through. Preferably the belt of the conveyor is made of good grade micro-perforated technopolymer. In a preferred embodiment the belt has a width of 0.5 m.

Preferably, according to a preferred embodiment of this variant of the invention, the rice bud transits on a conveyor belt, first through the stabilization station 31 and subsequently and seamlessly, i.e. without interruptions in the processing cycle and without the interposition of other processing steps, through the cooling station 33.

Further, again according to a preferred embodiment of the invention, the bud exiting the stabilization station 31 or, when present, the cooling station 33, is processed in the weighing station 37 and the packaging station 39, seamlessly, i.e. without interruptions in the processing cycle and without the interposition of other processing steps.

According to the invention, preferably, the complete processing cycle carried out by the second section 11b of the facility 11 is performed within 24 hours of the end of the processing of the previous cycle carried out by section 11$a_w$.

Furthermore, again according to a preferred embodiment of the invention, the steps described with reference to both the first section 11a and the second section 11b of the facility 11 are performed seamlessly, i.e. without interruptions in the processing cycle and without the interposition of other processing steps, and the material processed according to the processing cycle of the first section 11a is preferably intended for processing and processed according to the processing cycle of the second section 11b, within 24 hours of the end of the cycle of the first section 11a of the facility.

Preferably, moreover, the delivery of the material from any station to the immediately subsequent station of the facility 11 takes place by means of pneumatic conveyors for dusty materials or by gravity or by means of one or more conveyor belts.

The disclosed embodiment of the facility 11 provides for the possibility of autonomous use of the second section 11b of the facility, which is thus functionally independent of the first section and is not subject to the presence of the first section 11$a_w$.

Figure 2:
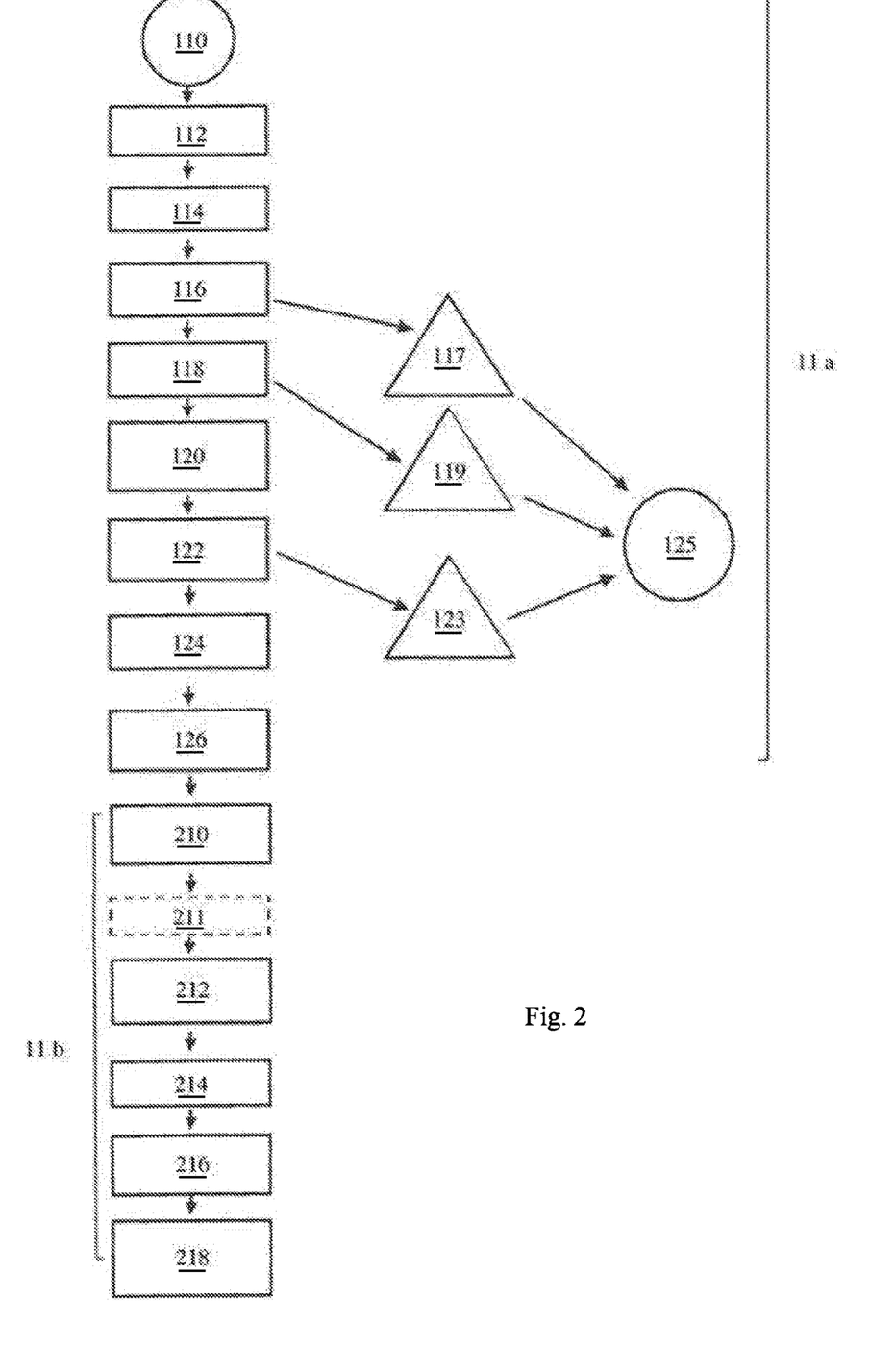
FIG. 2 is a flow chart of a first embodiment of the method according to the invention.

With reference to FIG. 2, a preferred embodiment of the method according to the invention will be described below.

In a preferred embodiment of the invention, the method of producing a ready-to-use food product based on rice bud mainly comprises two distinct and autonomous processes, the first for obtaining the bud and the second for stabilizing it. In particular, in the illustrated embodiment, the first process for obtaining the bud from the raw grain includes:
- a step 110 of delivering the husked rice or paddy rice;
- a step 112 of separating, for example by blower, the volatile dust from the heavier material to be treated;
- a dust separation step 114 preferably obtained by a cyclone;
- a step 116 of separating, preferably by means of a plansifter sieve, the rice grains which are intended for subsequent processing steps, from the scraps such as, in particular, bran, husk and middling; in step 116 the rice bran is separated from the rest of the product and discarded in step 117 and subsequently collected in step 125 together with the other scrap materials, as will be clear from the description below;
- a classification step 118, preferably obtained by a grinding machine, to collect the heavier parts that are intended for the next steps, while the lighter ones are discarded; in step 118 the waste products are separated from the rest of the product and discarded in a step 119 and then collected in a step 125 together with the other waste materials;
- a pneumatic suction transport step 120 for the upwards separation of unwanted volatile dusty materials, allowing the heavier material to precipitate downwards and destined for subsequent processing steps;
- a step 122 in which the material from step 118 through step 120 is precipitated, preferably by a densimeter vibrating table, for the selection of the larger buds most suitable for marketing; in step 122 the discarded buds are separated from the rest of the product and discarded in a step 123 and subsequently collected in a step 125 together with the other waste materials.

The material consisting mostly of the rice bud from step 120 is then sent to one or more collection or storage steps 124,126 in which a stock of collected material is formed to ensure continuity to the next steps of the process.

The process for stabilizing the bud will be described in the description below. In particular, in the illustrated embodiment, the process for stabilizing the bud comprises:
- a radio-frequency stabilization step 210, preferably at a frequency of about 27 MHz;
- a delivery step 212, preferably by pneumatic suction transport to a vibrating tank;
- a storage step 214 to build up a sufficient stock of product to ensure continuity in the next steps of the process;
- a weighing step 216;
- a packaging step 218.

A cooling step 211 is provided in a variant of the method according to the invention at the end of the radio-frequency stabilization step 210.

According to a preferred embodiment of the invention, the packaging step 218 follows the stabilization step 210 seamlessly, i.e. without interruptions in the processing cycle and without the interposition of other processing steps.

According to the invention, preferably, the processing steps described with reference to the stabilization process are performed within 24 hours of the end of the processing of the process of obtaining the preceding bud.

Furthermore, again according to a preferred embodiment of the invention, the steps described with reference to both the first process and the second process are performed seamlessly, i.e. without interruptions in the processing cycle and without the interposition of other processing steps.

Preferably, moreover, the delivery of the material from any station to the immediately following station of the facility takes place by means of pneumatic conveyors for dusty materials or by gravity or by means of conveyor belts.

Also according to the invention, preferably, there is no provision for the addition of water or other liquids anywhere in the method.

EXAMPLE

In one embodiment of the invention 39,950 kg of paddy rice was treated, from which 502.45 kg of rice bud was obtained.

The subsequent stabilization process resulted in the following volumes of product which were packaged in pressurized cans in a modified nitrogen-based atmosphere:

| Number of cans | Weight of packaged product gr. | Moisture of the packaged product % |
|---|---|---|
| 83 | 350-390 | 7.5 |
| 54 | 350-390 | 8 |
| 84 | 350-390 | 7 |
| 628 | 350-390 | 7-8 |
| 61 | 350-390 | 5 |
| 126 | 700 | 6 |
| 138 | 700 | 7 |

The starting product, rice bud, subjected to the stabilization process had the following characteristics:
Initial moisture ≈9.0%
Density=600 kg/m3
Starting temperature≈11° C.

The product, rice bud, was subjected to the stabilization process by advancing on a conveyor in a bed of product of 120 mm thickness. The conveyor belt used was 1.5 m long.

The belt was advanced at different speeds obtaining the following moisture values of the product exiting the stabilization process:

| Test No. | Belt speed m/h | Output product moisture % | Productivity kg/hr |
|---|---|---|---|
| 1 | 18 | 8.0 | 280 kg/hr |
| 2 | 10 | 7.5 | 170 kg/hr |
| 3 | 7.5 | 7.0 | 120 kg/hr |
| 4 | 6.7 | 6.0 | 110 kg/hr |
| 5 | 6 | 5.0-5.2 | 100 kg/hr |

The air temperature in the stabilization process was set at 50° C. and the temperature of the product exiting the cooling phase was 14° C.

INDUSTRIAL APPLICABILITY

The invention finds advantageous application in the food industry for making ready-to-use food products based on rice bud in single-dose or larger packages. In particular, the invention finds advantageous industrial application in the production of a single-dose food ready for human or animal use as a food supplement.

The invention as described and illustrated is susceptible to numerous variations and modifications falling within the same inventive principle.

The invention claimed is:

1. A method for obtaining a ready-to-use food product based on rice bud, comprising the steps of:
    providing a certain quantity of rice bud;
    subjecting said quantity of rice bud to a radio-frequency drying treatment; and
    packaging at least part of said quantity of dried rice bud;
    wherein the step of providing a certain quantity of rice bud comprises the steps of:
        providing a certain quantity of husked rice or paddy rice; and
        separating rice buds from rice grains of the husked rice so as to obtain the certain quantity of rice bud with a purity of more than 70% by weight and wherein the radio-frequency drying step occurs within 24 hours of the separating step of the rice buds from the rice grains of the husked rice; and
    wherein the step of separating the rice buds from the rice grains comprises the steps of:
        subjecting the husked rice to a first separation treatment by means of a pneumatic cyclone in order to obtain separation between heavier material falling to a bottom of the cyclone and lighter material evacuated upwards;
        subjecting the heavier material exiting the cyclone to a treatment by plansifter so as to obtain separation of the rice grains from waste including bran, husk and middling;
        subjecting the rice grains separated in the plansifter to a classification step by means of a grinding machine in order to obtain separation of rice tips from the rice grains of a size equal to or greater than half of a grain of the rice grains;
        subjecting the rice grains exiting the classification step to a second separation treatment by means of a pneumatic cyclone so as to obtain separation between the heavier material falling to the bottom of the cyclone and the lighter material evacuated upwards;
        subjecting the heavier material exiting the second cyclone to a treatment step in a vibrating tank from which the rice bud is precipitated onto a densimeter table so as to obtain a classification of the rice bud according to the specific weight by separating smaller buds from larger ones; and
        subjecting the larger buds from the densimeter table to a second vibrating tank.

2. The method according to claim 1, further comprising a cooling step provided between the drying treatment and the packaging step.

3. The method according to claim 2, wherein the packaging step is carried out directly after the drying treatment or cooling step, without interruption and without interposition of other processing steps.

4. The method according to claim 3, wherein the drying treatment causes a temperature of the rice bud to rise to between 75° C. and 90° C.

5. The method according to claim 4, wherein the cooling step causes a temperature of said rice bud to be lowered to less than 20° C.

6. The method according to claim 5, wherein the temperature of the rice bud at the end of the cooling step is between 12° C. and 16° C.

7. The method according to claim 1, wherein the drying step is performed at a frequency of 27 MHz.

8. The method according to claim 1, wherein a moisture percentage of the rice bud at the end of the drying step is between 5% and 8%.

9. The method according to claim 1, wherein said certain quantity of rice bud has a purity greater than 90% by weight.

10. The method according to claim 1, wherein the packaging step is carried out directly after the drying treatment, without interruption and without interposition of other processing steps.

11. The method according to claim 10, wherein the drying treatment causes a temperature of the rice bud to rise to between 75° C.-90° C.

12. The method according to claim 1, wherein the plansifter has a hexagonal cross section capable of generating a discontinuous oscillation of the product.

13. The method according to claim 1, wherein said step of packaging occurs in vacuum cans.

14. The method according to claim 13, wherein the rice bud is packaged in metal vacuum cans in a modified and pressurized atmosphere.

15. The method according to claim 14, wherein the atmosphere includes an addition of nitrogen.

* * * * *